(12) United States Patent
Anderson et al.

(10) Patent No.: US 6,575,032 B2
(45) Date of Patent: Jun. 10, 2003

(54) SILICON FLEXURE SUSPENSION FOR SINGLE DEGREE OR FREEDOM FLOATED GYROSCOPE

(75) Inventors: Richard Anderson, Seabrook, NH (US); Devadas Dorai-Raj, Irvine, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/916,614

(22) Filed: Jul. 27, 2001

(65) Prior Publication Data

US 2003/0019295 A1 Jan. 30, 2003

(51) Int. Cl.$^7$ .................................................. G01P 9/04
(52) U.S. Cl. ...................................... 73/510; 73/504.04
(58) Field of Search ......................... 73/504.02, 504.03, 73/504.08, 504.09, 504.11, 514.02, 514.01, 514.15, 510, 504.04

(56) References Cited

U.S. PATENT DOCUMENTS

| | | | | |
|---|---|---|---|---|
| 3,680,391 A | * | 8/1972 | Denis ........................... | 73/505 |
| 4,751,718 A | * | 6/1988 | Hanse et al. ................... | 372/94 |
| 4,841,773 A | * | 6/1989 | Stewart ........................ | 73/510 |
| 5,650,568 A | * | 7/1997 | Greiff et al. ............. | 73/504.09 |
| 5,817,942 A | * | 10/1998 | Greiff ....................... | 73/514.01 |
| 6,357,295 B1 | * | 3/2002 | Wyse ....................... | 73/504.04 |

* cited by examiner

*Primary Examiner*—Helen Kwok
(74) *Attorney, Agent, or Firm*—Lynn & Lynn

(57) ABSTRACT

A suspension for a gyroscopic float assembly in a floating gyroscope system comprises a pair of flexures that each have an outer rim and a plurality of flexure beams extending from the outer rim. A plurality of flexure tabs extend outward from outer perimeter portions of the rims for mounting the flexure assembly to a pair of end caps. A plurality of strain relief passages formed in the rims is arranged to provide relief from thermally induced stresses. A plurality of angular stops formed in inner perimeter portions of the rims is arranged to constrain the flexure against rotation about a selected axis.

4 Claims, 2 Drawing Sheets

SILICON FLEXURE SUSPENSION FOR SINGLE DEGREE OR FREEDOM FLOATED GYROSCOPE

STATEMENT OF GOVERNMENT RIGHTS IN THE INVENTION

The United States government has rights in this invention under contract N00030-01-C-0014.

BACKGROUND OF INVENTION

This invention relates to inertial acceleration sensors and in particular to pendulous integrated gyroscopic accelerometers.

Accelerometers provide a measure of acceleration with respect to an inertial reference. A pendulous integrating gyroscopic accelerometer utilizes a floated gyroscope with an inherent mass unbalance with respect to a support axis. When an acceleration is imposed with respect to the sensing axis of the instrument, the floated gyroscope or float assembly is deflected by an angle, which is sensed by a pick-off. Typical prior art devices utilize a magnetic suspension for the float assembly supporting mechanism or suspension. These magnetic devices provide the required low angular spring rate and high radial and axial spring rates. These magnetic suspensions suffer from the requirement for exacting mechanical tolerances and costly manufacturing processes. There exists a need for a simpler and less costly device to improve the reliability and manufacturability of the pendulous integrating gyroscopic accelerometer float assembly suspension.

SUMMARY OF THE INVENTION

This invention provides flexure assembly for suspending a gyroscopic float assembly in a floating gyroscope system. The flexure comprises an outer rim and a plurality of flexure beams connected to the outer rim. A pair of such flexures is used to support the gyroscopic float assembly.

Each of the flexures may have in inner hub with the corresponding flexure beams having inner ends connected to the hub and outer ends connected to the outer rim.

The invention may include a plurality of flexure tabs extending outward from outer perimeter portions of the rims for mounting the flexure assembly to a pair of end caps.

The flexure preferably further comprising a plurality of strain relief passages formed in the rims and arranged to provide relief from thermally induced stresses.

The flexure preferably also further comprising a plurality of angular stops formed in inner perimeter portions of the rim and arranged to constrain the flexure against rotation about a selected axis.

DETAILED DESCRIPTION OF THE INVENTION

Figure 1:
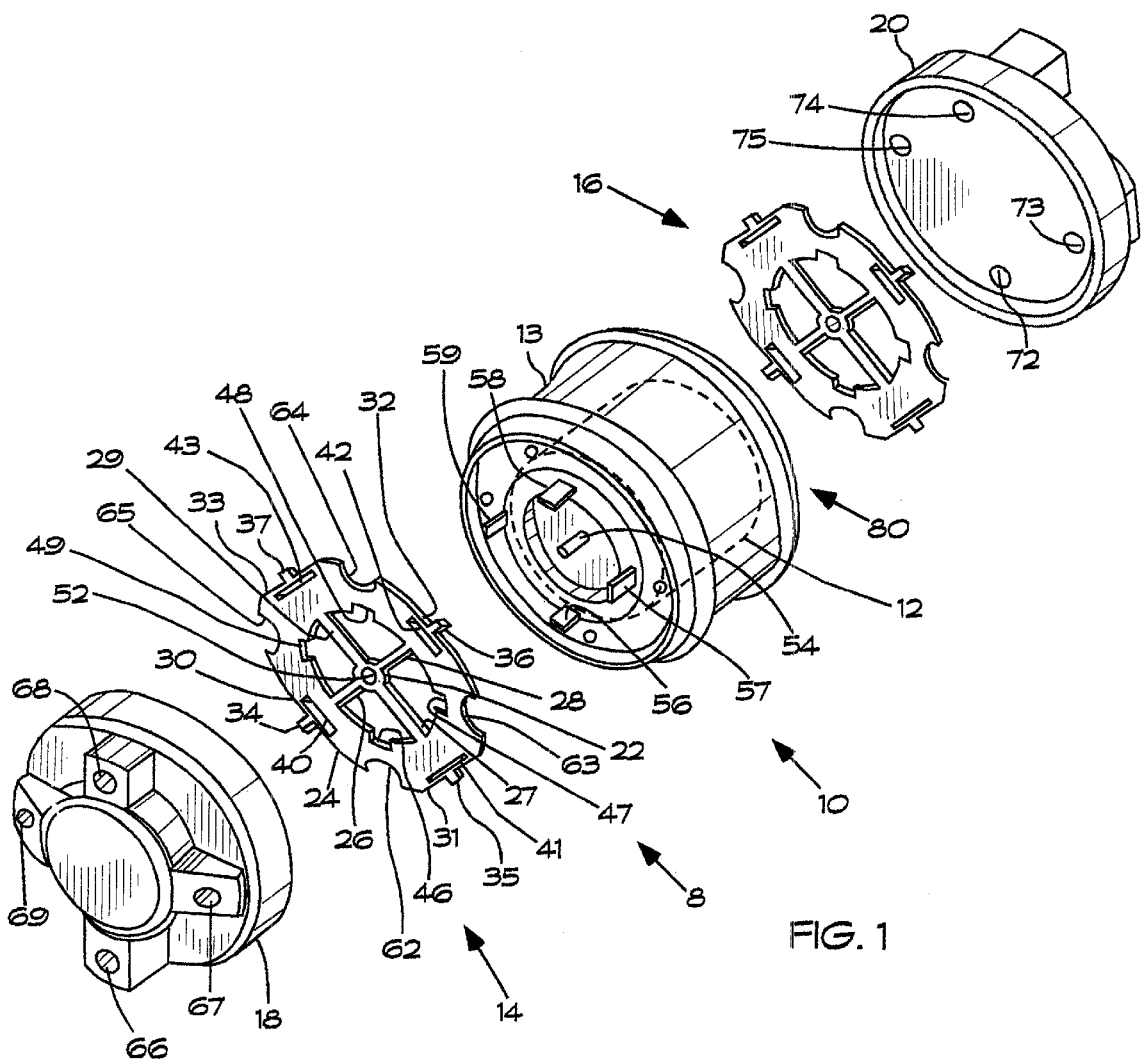
FIG. 1 is an exploded perspective view of the a floated gyroscope that includes a flexure suspension according to the invention.
Figure 2:
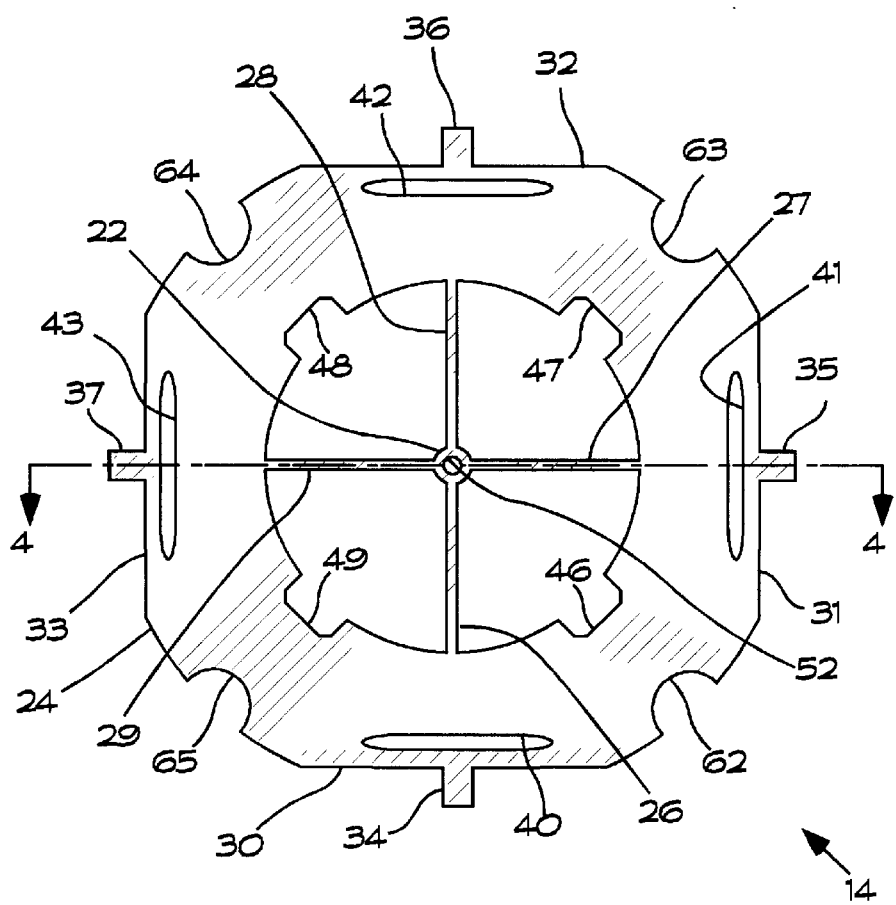
FIG. 2 is a top plan view of the flexure suspension according to the invention.
Figure 3:
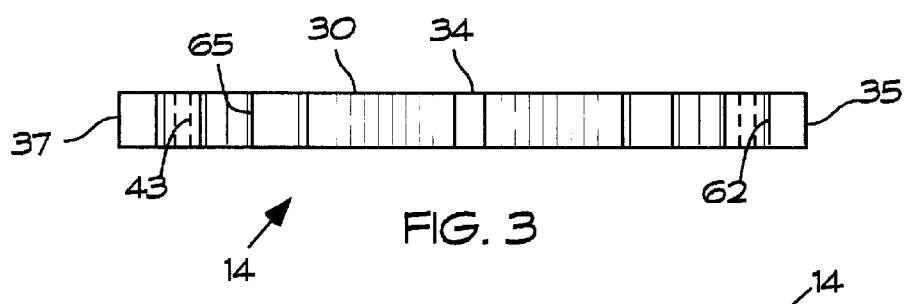
FIG. 3 is a front elevation view of the flexure suspension according to the invention.
Figure 4:
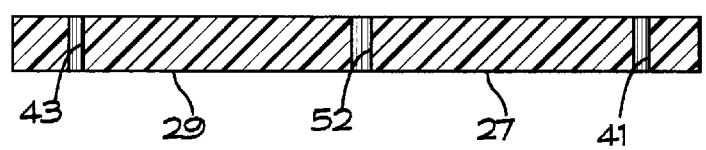
FIG. 4 is a cross sectional view along line 4—4 of FIG. 2.

Referring to the FIG. 1, the invention is directed to a flexure assembly 8 that is included in a sensor system 10 to support a pendulous integrating gyroscopic accelerometer float assembly 12 that is floated with a housing 13. The flexure assembly 8 includes a pair of flexures 14 and 16 and corresponding end cap flexure supports 18 and 20. The flexures 14 and 16 preferably are comprised of micromachined silicon. The flexures 14 and 16 are located on opposite sides of the housing 13 and are preferably identical. Therefore, only the flexure 14 is described in detail. It should be understood that the flexure 16 includes all structural features described with reference to the flexure 14.

As shown in FIGS. 1–4, the flexure 14 may be viewed as being formed generally in a "wagon wheel" configuration. Accordingly, the flexure 14 may include a central hub 22 and an outer rim 24. A plurality of flexure beams 26–29 are arranged to have inner ends connected to the central hub 22 and outer ends connected to the rim 24. The rim 24 has flattened side portions 30–33 spaced apart by equal angles around the rim 24. A plurality of flexure tabs 34–37 extend from the flattened side portions 30–33, respectively. The flexure tabs 34–37 are spaced apart by about 90° around the outer perimeter of the rim 24. The flexure tabs 34–37 are used to attach the flexures 14 and 16 to the end housings 18 and 20 so that the float assembly 12 is suspended in a "floating" arrangement so that is free to respond to acceleration perpendicular to an axis through the centers of the flexures 14 and 16 and the housing 13.

A plurality of strain relief passages 40–43 are formed near the flattened side surfaces 30–33, respectively. The strain relief passages 40–43 are preferably formed to have thin elongate configurations and are arranged so that their lengths are perpendicular to the corresponding flexure tabs 34–37. The strain relief passages 40–43 allow the flexure 14 to expand and contract as the temperature changes without interfering with the operational characteristics of the sensor system 10.

The flexure 14 also preferably includes a plurality of integral angular stops 46–49 formed as slots in the inner perimeter of the rim 24. The central hub 22 preferably has a passage 52 formed therein arranged so that a projection 54 from the housing 13 extends therethrough when the accelerometer is assembled. The housing 13 also preferably includes a plurality of detents 56–59 arranged to extend through the stops 46–49. The projection 54 and passage 52 cooperate to maintain the flexure 14 and the housing 13 in axial alignment during assembly of the sensor system 10. The angular stops 46–49 and the detents 56–59 cooperate to restrain the flexure 14 and housing 13 against relative rotation about their longitudinal axes, which are in alignment with the projection 54.

The flexure 14 may also include a plurality of notches 62–65 formed in the outer periphery of the rim 24. The end caps 18 and 20 include holes 66–69 and 72–75, respectively, that are aligned with the notches 62–65. When the accelerometer is assembled, tooling rods (not shown) extend through the corresponding notches 62–65 and the holes 66–69 and 72–75, which are actually blind tooling holes. The tooling rods provide the appropriate spacing and support to the flexures 14 and 16 and float assembly 12 while these parts are being bonded together. Suitable nuts (not shown) are mounted on the bolts to hold the housing 13, the flexures 14 and 16 and the end caps 18 and 20 together.

The housing 13 is formed generally as a cylinder. The housing and pendulous integrating gyroscopic accelerometer float assembly 12 are well known in the art. The housing 13 has an end 80 that faces the flexure 16. The end 80 of the housing 13 has a projection (not shown) like the projection 54 and detents (not shown) like the detents 56–59. When the sensor system 10 is assembled, the end 80 of the housing 13 engages the flexure 16 in the same manner as described above for the flexure 14.

The flexure assembly 8 mechanically supports the float assembly 12 with a low angular spring rate and high radial and axial spring rates. The flexure assembly 8 provides the desired spring rates with no complex mechanical parts or electrical windings. The flexure beams 26–29 may have dimensions that depend on the specific application for which the sensor system 10 is designed. The flexure beams 26–29 may for example have thicknesses of about 0.001 in. and lengths of about 0.45 in. The overall diameter of the flexure 14 may be about 1 in.

The flexures 14 and 16 preferably are made from silicon and machined using standard micro-electro-mechanical-systems (MEMS) manufacturing techniques.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A flexure suspension for a gyroscopic float assembly for an accelerometer, comprising:
   a hub;
   an outer rim;
   a plurality of flexure beams having a first end connected to the outer rim and a second end connected to the hub;
   a plurality of flexure tabs extending outward from outer perimeter portions of the outer rim;
   a plurality of stops formed in inner perimeter portions of the rim and arranged to constrain the flexure suspension against rotation about a selected axis; and
   a plurality of strain relief passages formed in the outer rim and arranged to provide relief from thermally induced stress.

2. The flexure suspension of claim 1 wherein the outer rim, the plurality of flexure beams, the hub and the plurality of flexure tabs are integrally formed in a silicon crystal.

3. A floating gyroscope system, comprising;
   a float assembly having a first end and a second end;
   a first end cap;
   a second end cap;
   a first flexure suspension connected between the first end cap and the float assembly, the first flexure suspension comprising:
      a first hub;
      a first outer rim;
      a first plurality of flexure beams connected between the first outer rim and the first hub;
         a first plurality of flexure tabs extending outward from outer perimeter portions of the first outer rim arranged for mounting the first flexure suspension to the first end cap;
         a first plurality of stops formed in inner perimeter portions of the first outer riot and arranged to constrain the first flexure suspension against rotation about a selected axis; and
         a first plurality of strain relief passages formed in the first outer rim and arranged to provide relief from thermally induced stresses;
   a second flexure suspension connected between the second end cap and the float assembly, the second flexure suspension comprising:
      a second hub;
      a second outer rim;
      a second plurality of flexure beams connected between the second outer rim and the second hub;
      a second plurality of flexure tabs extending outward from outer perimeter portions of the second outer rim arranged for mounting the second flexure suspension to the second end cap, the first plurality of flexure tabs and the second plurality of flexure tabs cooperating to allow the float assembly to float between the first and second end caps such that the float assembly is free to move in response to acceleration along a sensing axis;
      a second plurality of stops formed in inner perimeter portions of the second outer rim and arranged to constrain the second flexure suspension against rotation about a selected axis; and
      a second plurality of strain relief passages formed in the second outer rim and arranged to provide relief from thermally induced stresses.

4. The A floating gyroscope system of claim 3 wherein the first outer rim, the first plurality of flexure beams, the first hub and the first plurality of flexure tabs are integrally formed in a first silicon crystal and wherein the second outer rim, the second plurality of flexure beams, the second hub and the second plurality of flexure tabs are integrally formed in a second silicon crystal.

* * * * *